United States Patent [19]

Murphy

[11] 4,319,437

[45] Mar. 16, 1982

[54] ROOFING SHINGLE ASSEMBLY HAVING SOLAR CAPABILITIES

[76] Inventor: John A. Murphy, 7273 N. Central Ave., Phoenix, Ariz. 85020

[21] Appl. No.: 114,917

[22] Filed: Jan. 24, 1980

[51] Int. Cl.³ .......................... F24J 3/02; E04B 5/48; E04D 1/12
[52] U.S. Cl. ...................................... 52/220; 52/478; 52/530; 52/531; 126/432; 126/DIG. 2
[58] Field of Search ................. 52/478, 531, 530, 588, 52/220; 126/432, 448, DIG. 2

[56] References Cited

U.S. PATENT DOCUMENTS

| | | | |
|---|---|---|---|
| 2,377,398 | 6/1945 | Brostrom | 52/478 X |
| 2,736,406 | 2/1956 | Johnson | 52/588 X |
| 3,128,851 | 4/1964 | De Redder et al. | 52/588 |
| 3,452,498 | 7/1969 | Kinsey | 52/588 |
| 3,485,000 | 12/1969 | Fiquet | 52/588 X |
| 4,111,188 | 9/1978 | Murphy | 126/DIG. 2 |
| 4,204,520 | 5/1980 | Rosenberg | 126/432 |
| 4,221,208 | 9/1980 | Murphy | 126/432 |

FOREIGN PATENT DOCUMENTS

| | | | |
|---|---|---|---|
| 2702938 | 7/1978 | Fed. Rep. of Germany | 126/432.1 |
| 2702939 | 7/1978 | Fed. Rep. of Germany | 126/DIG. 2 |

*Primary Examiner*—Alfred C. Perham
*Attorney, Agent, or Firm*—Sughrue, Mion, Zinn, Macpeak and Seas

[57] ABSTRACT

A roofing shingle assembly having solar capabilities comprising a flat main portion having upper and lower surfaces, and curved segments integral with the upper and lower edges of said shingle. The roofing shingles are mounted in overlapping parallel array with the curved segments interconnected to define a fluid conduit enclosure. Mounting brackets for the shingles are secured on the roof rafters.

5 Claims, 2 Drawing Figures

ROOFING SHINGLE ASSEMBLY HAVING SOLAR CAPABILITIES

BACKGROUND OF THE INVENTION

1. Field of the Invention

This invention pertains to an extruded metallic roofing structure wherein shingles having solar capabilities are provided with curved segments which are interconnected to form fluid conduit enclosing means.

2. State of the Prior Art

Prior developments in this field are shown, by way of general illustration, in the below listed patents:

| Patentee | U.S. Pat. No. | Issue Date |
| --- | --- | --- |
| Eaton | 1,802,635 | Apr. 28, 1931 |
| Scott | 2,311,579 | Feb. 16, 1943 |
| Swanton, Jr. | 2,544,474 | Mar. 6, 1951 |
| Stockstill | 2,594,232 | Apr. 22, 1952 |
| Harris | 2,625,930 | Jan. 20, 1953 |
| Lof | 2,680,565 | June 8, 1954 |
| Rostock | 2,705,948 | Apr. 12, 1955 |
| Brunton | 3,001,331 | Sep. 26, 1961 |
| Lappala et al | 3,006,818 | Oct. 31, 1961 |
| Bargues | 3,194,228 | July 13, 1965 |
| Thomason | 3,254,643 | June 7, 1966 |
| Hervey | 3,262,493 | July 26, 1966 |
| Thomason | 3,369,539 | Feb. 20, 1968 |
| Snelling | 3,390,672 | July 2, 1968 |
| Harris, Jr. | 3,620,206 | Nov. 16, 1971 |
| Gaydos, Jr. | 3,815,574 | June 11, 1974 |
| Salvail | 3,847,316 | Nov. 12, 1947 |
| Frank | 3,875,926 | Apr. 8, 1975 |
| Stout et al | 3,918,430 | Nov. 11, 1975 |
| Murphy | 4,111,188 | Sep. 5, 1978 |

SUMMARY OF THE INVENTION

The invention hereof provides a roofing shingle assembly in which a series of shingles are interconnected in a continuous array on a roof or building side. The shingles have curved segments at the ends thereof which interconnect to form fluid conduit enclosing means. Said fluid conduit carrying a heat transfer medium in liquid or fluid form which is heated by the solar capabilities of the shingles. The fluid conduit may form a continuous line which defines an open loop system.

The shingle hereof transfers heat collected on its surface and curved segments to the fluid conduit which in turn transfers the heat to the fluid flowing within the conduit. The shingle also possesses structural interconnections whereby adjacent shingles are interlocked to form a continuous array and to form an enclosure for the fluid conduit. The interconnections of the curved segments provide superior structural stability in combination with the mounting brackets on the rafters.

DESCRIPTION OF THE PREFERRED EMBODIMENT

Figures 1, 2:
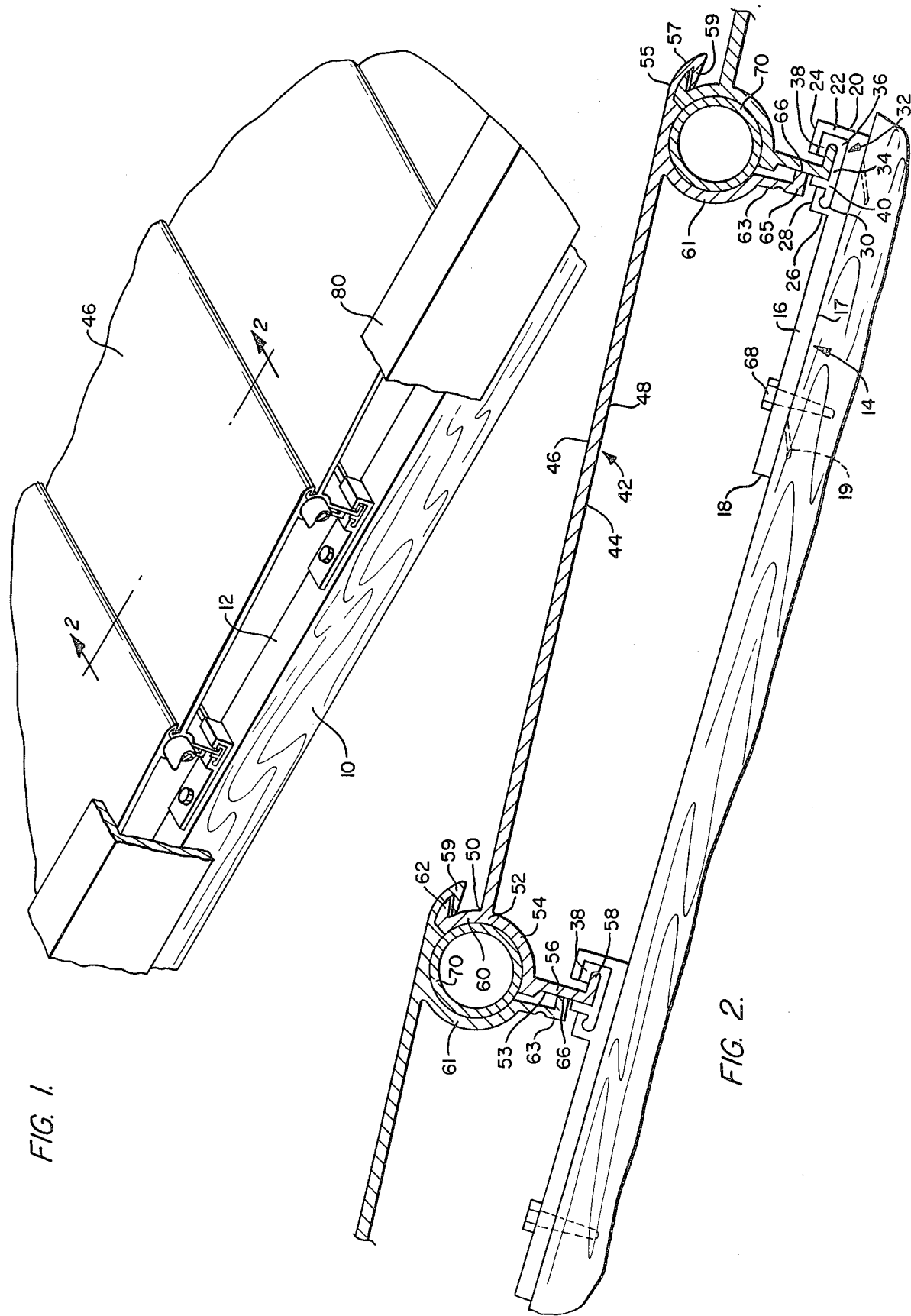
FIG. 1 is an end perspective view of a portion of a roofing shingle assembly hereof, with a section broken away for disclosure of details.
FIG. 2 is an enlarged sectional view showing the interconnections forming the fluid conduit enclosure and the brackets.

Referring to the drawings in more detail, a building has a plurality of spaced apart rafters or studs 10 each including a top surface 12. While only a single rafter 10 is shown in the drawings, it will be understood that a continuous series of them are included. The rafters or studs form an open framework which in conventional construction is covered by plywood, composition board, or the like and to which finish materials are subsequently applied. In lieu of such conventional construction the present invention contemplates the application of the shingle assembly hereof directly to the rafters or studs.

The assembly includes a plurality of brackets 14 each comprising an elongated plate 16 having opposite ends 18 and 20 and a base wall 17. Projecting from the base wall 17 are a pair of fore and aft barbs 19 (FIG. 2) which function to prevent twisting of the bracket by engagement in the rafter 10 as shown. A vertical wall 22 is located at the end 20, and has a lip 24 extending inwardly. Spaced forwardly from the vertical wall 22 is a second upstanding wall 26 which has a horizontal top foot member 28 extending toward the lip 24. The foot member 28 is recessed at 30 and a plastic insert 32 of the type shown in my patent application Ser. No. 827,417 is seated therein. Such insert includes a base 34 and a front wall 36 which abuts the vertical wall 22. A retaining lip 38 underlies the lip 24, and an upright wall 40 extends from the base inwardly forward of the foot member 28 of the bracket.

The shingles 42 hereof have elongated, flat main shingle portions 44 having upper and lower surfaces 46 and 48. An upper edge 50 has an upper curved segment 52 intergrally constructed with the flat portion 44. Curved segment 52 has a downwardly extending circular projection 54, an L-shape flange 56 having a vertical wall 53 and a horizontal foot member 58, and an upwardly extendng circular projection 60 having a reverse outwardly extending flange member 62. The curved segment 52 defines approximately one-half circular portion of a fluid conduit enclosing means.

A lower edge 55 of the shingle is provided with a forwardly extending curved outer portion 57 which has a reverse inwardly turned flange 59. Integral with the edge 55 and depending therefrom is a lower curved segment 61 having an L-shape flange 63. A horizontal foot 65 projects from the L-shape flange 63 and has a vertical wall 66. Curved segment 61 defines approximately a second half circular portion of a fluid conduit enclosing means.

As illustrated in FIGS. 1 and 2 the brackets 14 are mounted on the rafters 10 in selected, spaced array arrangement by fasteners 68 of suitable means. The brackets are in longitudinal rows of connection of the shingles in continuous rows along the rafters. The vertical spacing of the brackets is such that the L-shaped flange 56 seats in the plastic inserts 32 with foot member 58 partially underlying the retaining lip 38 with the vertical wall 53 against the wall 40 of insert 32.

The next adjacent shingle is then interlocked to a proceeding shingle by hooking the flange 59 under the flange member 62 and rotating the shingle counterclockwise until the vertical wall 66 of flange 63 rests against vertical wall 53 of flange 56. Thus connected, the curved segments 52 and 61 define fluid conduit enclosing means. Thereafter, a fluid conduit 70 may be inserted through the the thus formed enclosure. Alternatively, after the first shingle has been placed in position on the brackets the fluid conduit may then be positioned against a curved segment and the next adjacent shingle connected as above, thus enclosing the fluid conduit between the curved segments.

It will be understood that a starting block (not shown) formed according to a particular installation requirements will be provided. It is further contemplated that the first and last shingles will be provided with a suitable end structure which may be in the form of separate curved segments severed from a shingle and suitably secured such that the fluid conduit is completely enclosed. The sides of the assembly are closed by a channel member 80.

The fluid conduit 70 may form a continuous line forming what is known in the industry as a open loop system wherein fluid, such as water or the like, is circulated directly through the conduit and is heated by the solar heat collected by the shingle and which is transfered to the fluid conduit for heating the fluid flowing therein.

I claim:

1. An extruded metal roofing shingle for mounting in multiple shingle, edge overlapping, parallel array fashion on laterally spaced rafters of a building structure or the like, said shingle comprising:
    an elongated flat main portion, having upper and lower surfaces and laterally opposed upper and lower curved segments, said curved segments each defining half circular portions which, when interconnected with an adjacent shingle define fluid conduit enclosing means;
    fluid conduit means enclosed within said interconnected curved segments of adjacent shingles;
    an outwardly extending flange on said lower curved segment and an inwardly turned flange on said upper curved segment; and
    said outwardly extending flange and said inwardly turned flange defining interlocking means for said upper and lower curved segments of adjacent shingles for forming a tight mechanical interlocking connection between overlapping edges of adjacent shingles.

2. The invention of claim 1, and: bracket means on the rafters.

3. The invention of claim 1, wherein:
    means depending from said curved segments having a horizontal foot member engage said bracket means.

4. In combination with a roofing shingle assembly having a plurality of shingles mounted in multiple shingle, edge overlapping array on laterally aligned rafters having a plurality of brackets arranged in laterally aligned rows wherein means on said shingle engage said brackets, the improvement which comprises:
    a shingle having upper and lower curved segments, said curved segments integrally extruded on upper and lower edges of each of the shingles;
    said curved segments extending the full length of the shingles and defining half circular portions of fluid conduit enclosing means;
    a forwardly extending curved outer portion on the lower edge of said shingle having a reverse inwardly turned flange;
    an upwardly extending circular projection on said upper edge having a reverse outwardly extending flange;
    said forwardly extending curved outer portion interlocked with said upwardly extending circular projection; and
    said curved segments interconnected to define fluid conduit enclosing means.

5. A roofing shingle assembly for mounting on a building frame having laterally spaced rafters, comprising:
    a plurality of shingles for mounting in multiple shingle, edge overlapping array on rafters, the shingles each including a flat main portion with upper and lower surfaces;
    integrally extruded curved segments on the upper and lower edges of each shingle, said curved segments extending the full length of the shingles and each defning half circular portions of fluid conduit enclosing means;
    an upwardly extending circular projection on one of said curved segments having a reverse outwardly extending flange mamber;
    a forwardly extending outer curved outer portion on the lower edge of said shingle having a reverse inwardly turned flange;
    said forwardly extending outer curved portion interlocked with said reverse outwardly extending flange member; and
    said curved segments and said interlocked flanges defining fluid conduit enclosing means for an open loop system whereby solar heat collected on the shingles is transfered to the open loop fluid conduit thereby heating fluid flowing therein.

* * * * *